(12) United States Patent
Jun et al.

(10) Patent No.: US 11,007,469 B2
(45) Date of Patent: May 18, 2021

(54) AIR CLEANER

(71) Applicant: Samsung Electronics Co., Ltd., Gyeonggi-do (KR)

(72) Inventors: Young-Joong Jun, Seoul (KR); Sang Sung Woo, Seoul (KR); Jae Hyung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 16/074,836

(22) PCT Filed: Feb. 27, 2017

(86) PCT No.: PCT/KR2017/002130
§ 371 (c)(1),
(2) Date: Aug. 2, 2018

(87) PCT Pub. No.: WO2017/150856
PCT Pub. Date: Sep. 8, 2017

(65) Prior Publication Data
US 2019/0039009 A1    Feb. 7, 2019

(30) Foreign Application Priority Data

Mar. 2, 2016 (KR) .......................... 10-2016-0025008

(51) Int. Cl.
*B03C 3/16*        (2006.01)
*B01D 47/06*       (2006.01)
(Continued)

(52) U.S. Cl.
CPC .......... *B01D 47/06* (2013.01); *B01D 46/0005* (2013.01); *B01D 53/78* (2013.01);
(Continued)

(58) Field of Classification Search
CPC combination set(s) only.
See application file for complete search history.

(56) References Cited

U.S. PATENT DOCUMENTS

| 3,260,189 A | * | 7/1966 | Jensen | ...................... F24F 3/16 |
| | | | | 126/299 D |
| 3,672,126 A | * | 6/1972 | Goettle | ..................... F24F 3/12 |
| | | | | 96/18 |

(Continued)

FOREIGN PATENT DOCUMENTS

| GB | 2499042 A | 8/2013 |
| JP | 2009-119316 A | 6/2009 |

(Continued)

OTHER PUBLICATIONS

Indian Search Report dated Nov. 29, 2019.
European Search Report dated Jan. 17, 2019.
European Search Report dated Jun. 16, 2020.

*Primary Examiner* — Frank M Lawrence, Jr.
*Assistant Examiner* — Sonji Turner
(74) *Attorney, Agent, or Firm* — Cha & Reiter, LLC.

(57) ABSTRACT

Disclosed is an air cleaner capable of removing contaminants in the air by using various air cleaning methods. The air cleaner includes a case including an upper opening through which air is introduced, a lower opening through which purified air is discharged, a filter module detachably mounted in the case and configured to filter out contaminants in the air, an injector injecting water, and an electric dust collecting device located below the injector and collecting dust in the air.

14 Claims, 7 Drawing Sheets

(51) Int. Cl.
  *B01D 53/78* (2006.01)
  *B03C 3/08* (2006.01)
  *B03C 3/36* (2006.01)
  *B03C 3/47* (2006.01)
  *B03C 3/41* (2006.01)
  *B03C 3/017* (2006.01)
  *B03C 3/155* (2006.01)
  *F24F 13/28* (2006.01)
  *F24F 8/10* (2021.01)
  *F24F 8/192* (2021.01)
  *B01D 46/00* (2006.01)
  *F24F 8/108* (2021.01)
  *F24F 8/117* (2021.01)

(52) U.S. Cl.
  CPC ............ *B03C 3/017* (2013.01); *B03C 3/08* (2013.01); *B03C 3/155* (2013.01); *B03C 3/16* (2013.01); *B03C 3/368* (2013.01); *B03C 3/41* (2013.01); *B03C 3/47* (2013.01); *F24F 8/10* (2021.01); *F24F 8/192* (2021.01); *F24F 13/28* (2013.01); *B01D 2273/30* (2013.01); *F24F 8/108* (2021.01); *F24F 8/117* (2021.01); *Y02A 50/2351* (2018.01)

(56) References Cited

U.S. PATENT DOCUMENTS

| | | | | |
|---|---|---|---|---|
| 4,955,995 | A * | 9/1990 | Pontius | B01D 39/00 55/467 |
| 6,214,074 | B1 * | 4/2001 | Silviera | B01D 46/0038 55/385.4 |
| 6,500,240 | B1 * | 12/2002 | Tomimatsu | B03C 3/013 239/690 |
| 7,041,159 | B2 * | 5/2006 | Entezarian | B01D 50/002 55/320 |
| 7,789,921 | B2 | 9/2010 | Thurin et al. | |
| 8,465,575 | B2 * | 6/2013 | Tanaka | B03C 3/08 96/98 |
| 9,283,573 | B2 * | 3/2016 | Nock | B03C 3/36 |
| 2005/0150516 | A1 * | 7/2005 | Fujii | H01L 21/31138 134/1.3 |
| 2006/0055547 | A1 * | 3/2006 | DiMaggio | F24F 11/30 340/607 |
| 2006/0130446 | A1 * | 6/2006 | Herbst | B01D 46/0086 55/385.1 |
| 2009/0038480 | A1 * | 2/2009 | Garman | F24F 1/0071 96/414 |
| 2010/0091500 | A1 * | 4/2010 | Herbst | B01D 46/0086 362/294 |
| 2010/0313761 | A1 | 12/2010 | Tanaka et al. | |
| 2011/0139005 | A1 * | 6/2011 | Kwon | B01D 46/08 95/216 |
| 2013/0047857 | A1 * | 2/2013 | Bohlen | B03C 3/68 96/18 |
| 2013/0047858 | A1 * | 2/2013 | Bohlen | B03C 3/66 96/75 |
| 2013/0047859 | A1 * | 2/2013 | Bohlen | B03C 3/47 96/80 |

FOREIGN PATENT DOCUMENTS

| | | | |
|---|---|---|---|
| JP | 2009119316 A * | 6/2009 | ............ B03C 3/00 |
| JP | 2012-125719 A | 7/2012 | |
| KR | 10-2006-0023751 A | 3/2006 | |
| KR | 10-2008-0013399 A | 2/2008 | |
| KR | 10-2010-0070069 A | 6/2010 | |
| KR | 10-2015-0028466 A | 3/2015 | |

* cited by examiner

AIR CLEANER

CLAIM OF PRIORITY

This application is a National Phase Entry of PCT International Application No. PCT/KR2017/002130, which was filed on Feb. 27, 2017 and claims a priority to Korean Patent Application No. 10-2016-0025008, which was filed on Mar. 2, 2016, the contents of which are incorporated herein by reference.

TECHNICAL FIELD

The present disclosure relates to an air cleaner capable of effectively removing contaminants in the air.

BACKGROUND ART

An air cleaner is a device for purifying the air by removing dust, noxious gas and bacteria in the air. The air cleaner may be provided with a suction port for sucking contaminated indoor air, a filter for filtering out contaminants in the air, and a discharge port for discharging purified air.

Contaminants such as dust, noxious gas and bacteria contained in the air sucked through the suction port may be filtered out by the filter provided in the air cleaner. Clean air filtered by the filter may be discharged to the outside of the air cleaner through the discharge port.

The air cleaners may be largely classified into dry air cleaners and wet air cleaners.

Dry air cleaners may be classified into electric dust collection type and filter filtration type. The electric dust collection type has no need of changing the filter, but has a weak ability to remove contaminants. The filter type has an ability to remove contaminants, but generates the cost for maintenance to replace filter periodically.

The wet air cleaner is advantageous in that it does not need to change the filter because the inhaled air is brought into contact with the water so that the contaminants in the air are adsorbed and removed from the water. However, if the contact between water and air is not sufficient, then contaminants in the air are not sufficiently filtered out.

Air in the room may contain various kinds of pollutants such as dust, smell-generating chemicals, noxious gas, and oil mist which may be generated in cooking in the kitchen. Especially when there is a heat source such as a kitchen, pollutants may be present in the upper air. In order to purify the indoor air, these various kinds of pollutants must be effectively removed.

DISCLOSURE

Technical Problem

The present disclosure is directed to providing an air cleaner capable of removing contaminants in the air by using various air cleaning methods.

Further, the present disclosure is directed to providing an air cleaner capable of effectively removing contaminants contained in the upper air.

Further, the present disclosure is directed to providing an air cleaner having a notification function for notifying the cleaning cycle.

Technical Solution

One aspect of the present disclosure provides an air cleaner including a case including an upper opening through which air is introduced and a lower opening from which purified air is discharged, a filter module detachably mounted in the case, and filtering out contaminants in the air, an injector located below the filter module and injecting water, and an electric dust collecting device located below the injector and collecting dust in the air.

The filter module may include an oil filter for filtering out the oil particles in the air and a pre-filter for filtering out dust in the air.

The oil filter and the pre-filter may be provided to be separated or mounted together.

The oil filter and the pre-filter may be integrally mounted on a filter frame.

An upper water bottle in which water to be supplied to the injector is stored may be positioned at an upper portion of the case.

An inlet port communicating with the upper opening formed in the case may be formed in the upper water bottle.

A lower water bottle for collecting water injected from the injector may be located in a lower portion of the case.

A guide member including a plurality of guide ribs radially provided to guide the air discharged through the lower opening of the case to the side of the case may be positioned in the lower portion of the case.

A receiving portion may be provided at a center of the guide member, and the lower water bottle may be received in the receiving portion.

The lower water bottle may be mounted to or detached from the case together with the guide member.

The guide member may be located at a lower outer side of the case, and an outer diameter of the guide member may be the same as an outer diameter of the case.

The electric dust collector may include a plurality of dust collecting plates wherein a lower end of the dust collecting plate may be inclined from an upper outer side toward a lower center.

The air cleaner may further include a blowing fan flowing air in the case.

The case may be provided with an illumination indicating an operation state of the blowing fan.

The case may be provided with an illumination indicating a replacement timing of the filter module.

One aspect of the present disclosure provides an air cleaner including a case comprising an upper opening and a lower opening, a filter module filtering out contaminants in the air flowed in the case, an injector located below the filter module and injecting water to adsorb contaminants in the air, a first water bottle in which water to be supplied to the injector, a second water bottle collecting water injected from the injector, a an electric dust collecting device collecting dust in the air flowed in the case.

A water filter is provided in the case, and the water in the first water bottle may be supplied to the injector in a purified state through the water filter.

A blowing fan is provided in the case, the air flowing in the case through the upper opening, and blowing out through the lower opening in the purified state.

The filter module comprises an oil filter filtering out the oil particles in the air and a pre-filter filtering out dust in the air.

The case is provided with an illumination indicating, a replacement timing of the filter module, a water supplying timing of the first water bottle, and a water abandoning timing of the second water bottle.

Advantageous Effects

Contaminants in the air may be effectively removed by various air cleaning methods.

In addition, contaminants present in the upper air in a room where a heat source such as a kitchen is present may be easily removed.

Further, a user can regularly clean the air cleaner by the notification function informing the cleaning cycle, and thus it may possible to prevent the air cleaning efficiency from being lowered.

MODES OF THE INVENTION

Hereinafter, an air cleaner according to one embodiment will be described in detail with reference to the drawings.

Figure 1:
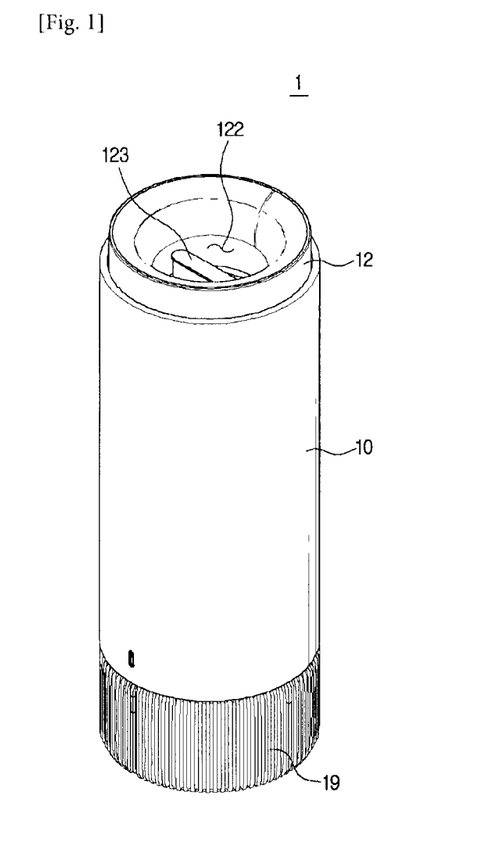
FIG. 1 is a perspective view illustrating an air cleaner according to one embodiment of the present disclosure.
Figure 2:
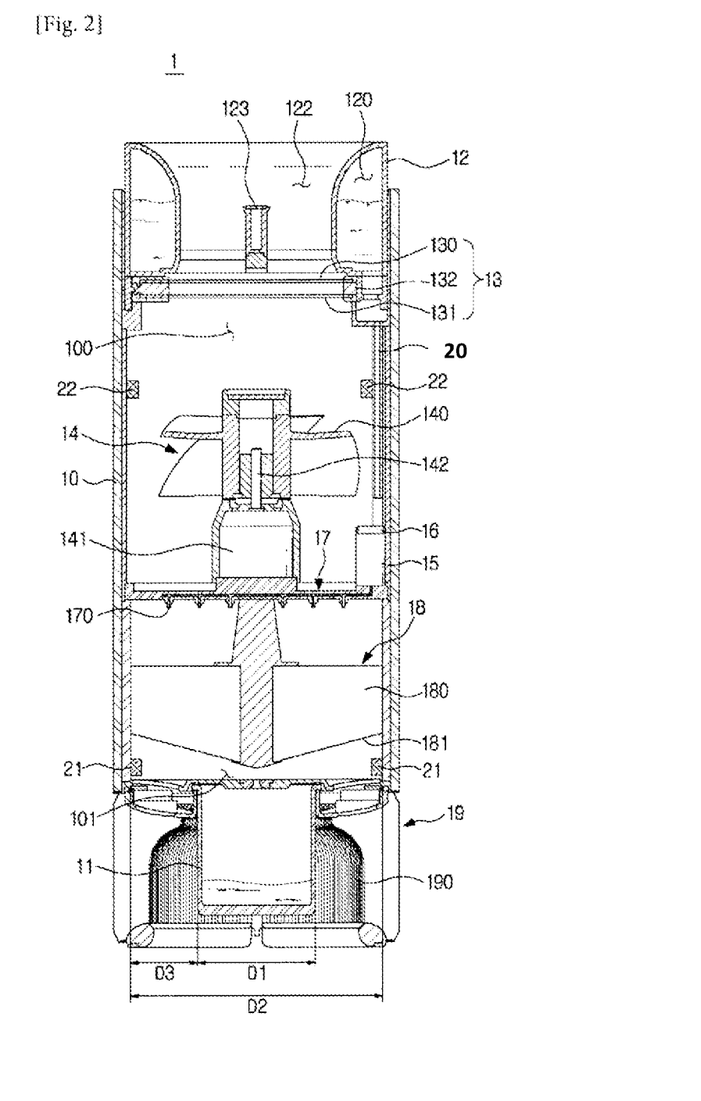
FIG. 2 is a cross-sectional view of the air cleaner according to one embodiment of the present disclosure.
Figure 3:
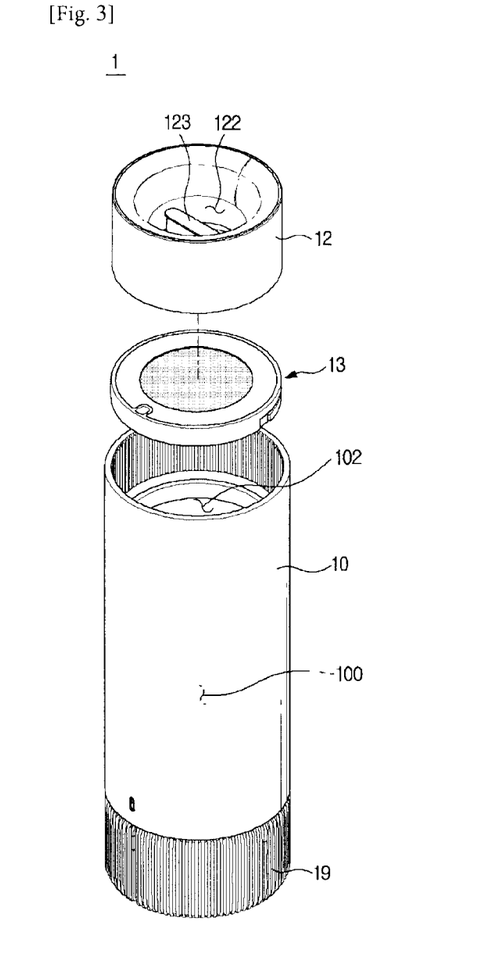
FIG. 3 is an exploded view of an upper structure of the air cleaner according to one embodiment of the present disclosure.
Figure 4:
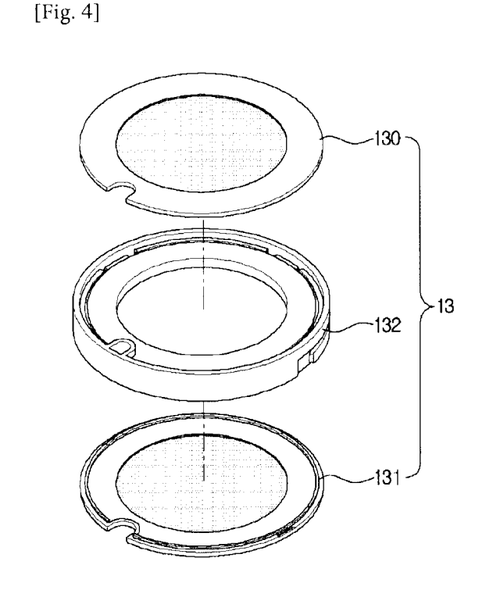
FIG. 4 is a diagram illustrating a filter assembly of the air cleaner according to one embodiment of the present disclosure.

FIG. 1 is a perspective view illustrating an air cleaner according to one embodiment of the present disclosure, FIG. 2 is a cross-sectional view of the air cleaner according to one embodiment of the present disclosure, FIG. 3 is an exploded view of an upper structure of the air cleaner according to one embodiment of the present disclosure, and FIG. 4 is a diagram illustrating a filter assembly of the air cleaner according to one embodiment of the present disclosure.

As shown in FIGS. 1 to 4, an air cleaner 1 according to one embodiment may include a case 10 forming an outer appearance and an air cleaning device accommodated inside the case 10. The air cleaning device may include a dry air cleaning device and a wet air cleaning device. The specific configuration of the air cleaning device accommodated in the case 10 will be described later.

In the case 10, a receiving space 100 in which the air cleaning device is accommodated may be formed. For example, the case 10 may be provided in a substantially cylindrical shape. Upper and lower portions of the case 10 may be opened. Outside air is introduced through an upper opening 102 provided in the upper portion of the case 10 and clean air having passed through the air cleaning device may be discharged to the outside through a lower opening 101 provided in the lower portion of the case 10.

A lower water bottle 11 is provided at the lower portion of the case 10 and an upper water bottle 12 may be provided the an upper portion of the case 10. The upper water bottle 12 is located on the upper opening 102 side of the case 10 and water injected to adsorb contaminants in the air may be stored. The lower water bottle 11 is located on the lower opening 101 of the case 10 so that the water adsorbing contaminants in the air may be collected and stored.

The upper water bottle 12 may be mounted on the upper side of the case 10. The upper water bottle 12 may be provided with a water tank 120 in which water is stored and an inlet port 122 communicating with the upper opening 102 of the case 10. For example, the inlet port 122 may be provided at a central portion of the upper water bottle 12 and the water tank 120 for storing water may be provided along the inlet port 122. An outer surface of the water tank 120 may be formed to correspond to the shape of an inner surface of the upper portion of the case 10.

The upper water bottle 12 may be detachably mounted to the case 10. When it is necessary to replenish the water in the water tank 120, the user may separate the upper water tank 12 from the case 10, fill the water tank 120 with water, and then connect the upper water bottle 120 to the case 10. The upper water bottle 12 may be provided with a handle 123 that may be operated by the user. The user may engage or disengage the upper water bottle 12 with the case 10 through an operation such as holding the handle 123 and rotating the handle. In addition, the user may move the upper water bottle 12 by holding the handle 123.

In the case 10, a filter module 13 may be provided. The filter module 13 may include an oil filter 130 capable of adsorbing fine oil particles in the air and a pre-filter 131 capable of holding a relatively large size of dust.

The oil filter 130 and the pre-filter 131 may be mounted on a filter frame 132. One of the oil filter 130 and the pre-filter 131 is mounted on one side of the filter frame 132 and the other is mounted on the other side opposite to one side of the filter frame 132.

When the filter module 13 is mounted on the case 10, the oil filter 130 may be located on the top of the pre-filter 131 or may be located below the pre-filter 131.

When the oil filter 130 and the pre-filter 131 are mounted on the filter frame 132 and are provided as one module, the oil filter 130 and the pre-filter 131 may be integrally mounted in or separated from the case 10. Since the oil filter 130 and the pre-filter 131 are modularly provided, the user may easily replace the filter.

The filter module 13 may be integrally replaceable. Alternatively, the oil filter 130 or the pre-filter 131 may be provided to separate from the filter frame 132 so that only a filter requiring replacement may be replaced with a new filter.

The oil filter 130 and the pre-filter 131 may be provided separately from each other without modularization and thus mounted in the case 10 or separated from the case 10

While the air introduced through the inlet port 122 passes through the oil filter 130, fine oil particles in the air may be adsorbed and filtered out. Dust and the like of relatively large size contained in the air may be filtered out while passing through the pre-filter 131.

A blowing fan 14 capable of flowing air inside the case 10 may be provided in the lower side of the filter module 13. The blowing fan 14 may be an axial fan in which a plurality of blades 140 is rotatably provided around a rotary shaft 142. The case 10 may be provided with a driving source 141 for transmitting a driving force to the rotating shaft 142.

An injector 17 may be provided at a lower portion of the blowing fan 14. The water stored in the upper water bottle 12 may be injected by the injector 17. The upper water bottle 12 and the injector 17 may be connected by a connection passage 20. The water stored in the upper water bottle 12 may be moved to the injector 17 through the connection passage 20.

In the case 10, a pump 15 capable of pumping water in the upper water bottle 12 may be provided. The pump 15 may be connected to the connection passage 170 or may be connected to the upper water bottle 12. The water in the upper water bottle 12 may be pumped by the pump 15 and moved to the injector 17 by a predetermined amount per unit time.

In the case 10, a water filter 16 capable of purifying water in the upper water bottle 12 may be provided. The water in the upper water bottle 12 may be moved to the injector 17 in a purified state after passing through the water filter 16. The water filter 16 may be any kind of filter as long as it is capable of filtering out impurities contained in water such as a reverse osmosis filter or an activated carbon filter. However, the water filter 16 may be detachably mounted in the case 10 so as to be replaceable.

The water stored in the upper water bottle 12 is pumped by a pump 15 and move to the injector 17 through the connection passage 20, and before being supplied to the injector 17 the water stored in the upper water bottle 12 is purified through the water filter 16.

The water supplied to the injector 17 may be injected to the lower side of the injector 17. That is, the injector 17 may inject water to the lower portion of the receiving space 100. The injector 17 includes a plurality of injection holes 170 spaced apart from each other. Through the plurality of injection holes 170, water may be evenly injected into a lower space of the injector 17.

Contaminants in the air passing through the injector 17 may be adsorbed in the water injected by the injector 17.

The electric dust collecting device 18 may be provided under the injector 17. The electric dust collecting device 18 may include a plurality of dust collecting plates 180. The electric dust collecting device 18 charges the fine contaminants contained in the air by using a high discharge voltage so that the charged contaminants may be collected in the dust collecting plate 180 that is positively (+) or negatively (−) charged.

The fine contaminants remaining in the air passing through the injector 17 may be filtered out while passing through the electric dust collector 18. The air that has passed through the electric dust collecting device 18 may be discharged to the outside through the discharge port 111 located in the lower portion of the case 10.

With respect to the vertical direction, the dust collecting plate 180 may have a longer length of a central portion of the dust collecting plate 180 than a length of the outer side of the dust collecting plate 180. Heights of an upper end of the central portion and the outer side of the dust collecting plate 180 may be the same as the height of the lower end of the dust collecting plate 180, but heights of a lower end of the central portion may be lower than that of the outer side of the dust collecting plate 180. That is, the lower end of the dust collecting plate 180 may be inclined from an upper portion of the outer side toward a lower portion of the central portion.

Due to a shape of the dust collecting plate 180, water flowing along a surface of the dust collecting plate 180 may be gathered at the lower central portion of the dust collecting plate 180 and fall down. That is, the water injected from the injector 17 flows along the surface of the dust collecting plate 180, and is collected at the lower central portion of the dust-collecting plate 180, and is dropped from the lower central portion of the dust collecting plate 180. The water may be collected in a lower water bottle 11 to be described later.

Figure 5:
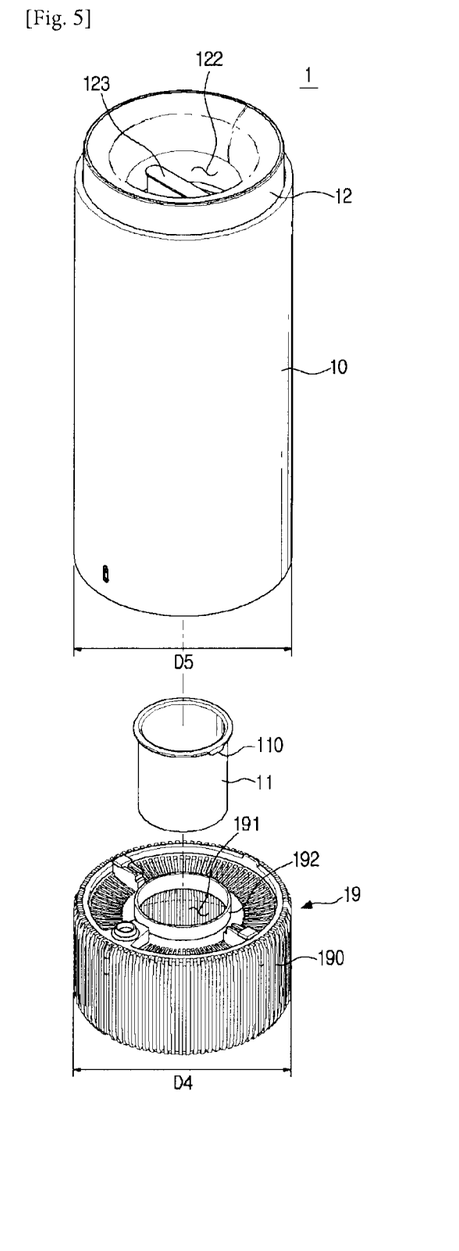
FIG. 5 is an exploded view of a lower structure of the air cleaner according to one embodiment of the present disclosure.

FIG. 5 is an exploded view of a lower structure of the air cleaner according to one embodiment of the present disclosure.

As shown in FIG. 5, the lower water bottle 11 may be positioned below the case 10 according to one embodiment. The lower water bottle 11 may be positioned below the electric dust collector 18.

The water injected by injector 17 may be collected in the lower water bottle 11. The lower water bottle 11 may be detachably mounted to the case 10. The user may separate the lower water bottle 11 from the case 10 and discard the water collected in the lower water bottle 11 if necessary.

A diameter D1 of the lower water bottle 11 may be smaller than a diameter D2 of the inner surface of the case 10. An outer surface of the lower water bottle 11 and the inner surface of the case 10 are spaced apart from each other by a predetermined distance D3 to form the discharge port 111. The air introduced through the inlet port 122 may be discharged to the outside through the discharge port 111 after contaminants in the air are removed.

A guide member 19 may be provided on the outer side of the lower water bottle 11 to guide the movement of air. The guide member 19 may include a plurality of guide ribs 190 extending radially around the lower water bottle 11. The air discharged through the discharge port 111 may be guided by the guide ribs 190 and flow to the outside of the air cleaner 1.

The guide member 19 may be provided so as to be exposed to the outside of the case 10 so that the air discharged through the discharge port 111 may be moved to the outside of the air cleaner 1. The air introduced through the inlet port 122 at the upper portion of the case 10 may be moved to the lower portion where the discharge port 111 is located and the air discharged through the discharge port 111 may be guided by the guide member 19 to flow a side direction.

Figure 6:
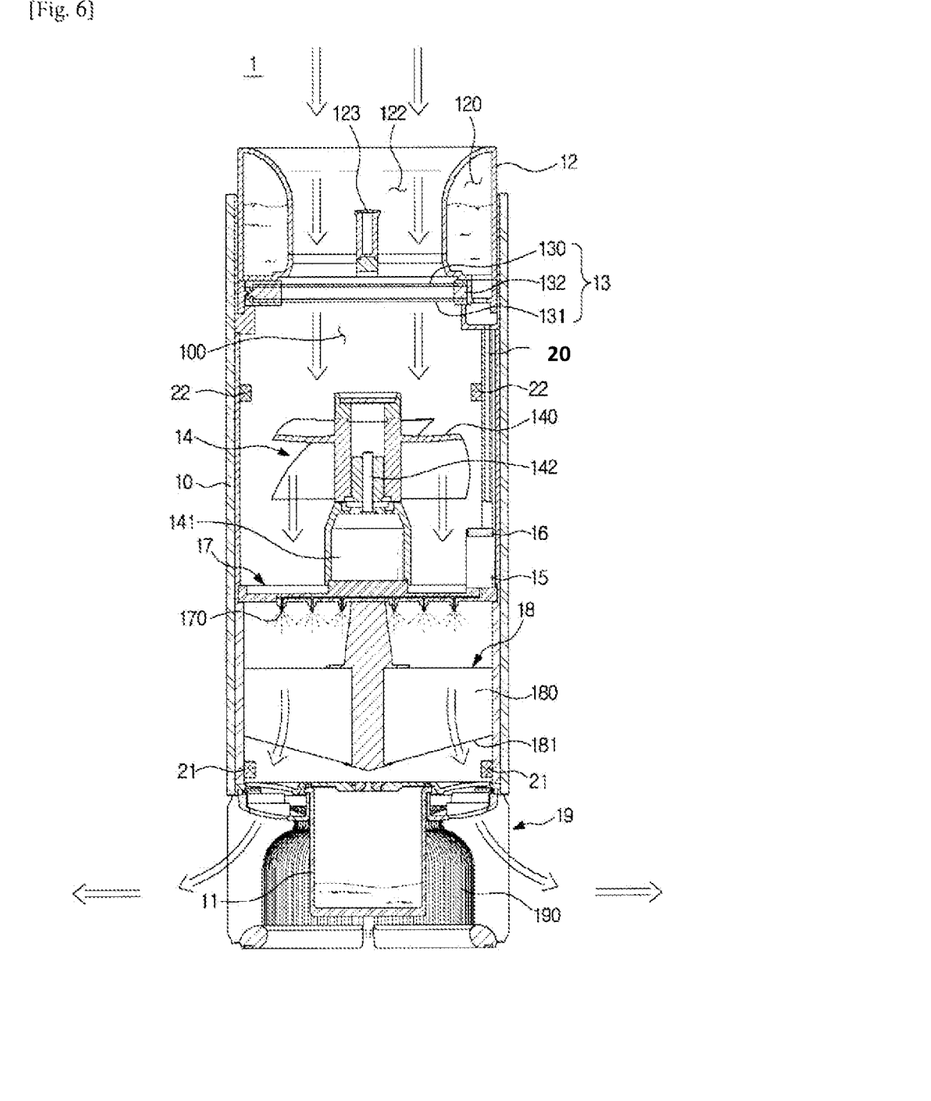
FIG. 6 is a view showing an air flow in the air cleaner according to one embodiment of the present disclosure.

In other words, air flows from the upper portion to the lower portion inside the air cleaner 1, but the air discharged through the discharge port 111 is changed in the sideway direction of air flow by the guide ribs 190. As a result, the clean air from which the pollutants have been removed may be spread farther toward the outside of the air cleaner 1.

An outer diameter D4 of the guide member 19 may be the same as an outer diameter D5 of the case 10. Thus, the guide member 19 and the case 10 may form a single cylindrical shape. The shapes of the guide member 19 and the case 10 are not limited to those described above.

The guide member 19 may be provided with a receiving portion 191 on which the lower water bottle 11 may be mounted. The receiving portion 191 may be provided at a center of the guide member 19. The plurality of guide ribs 190 may extend radially around the receiving portion 191. The lower water bottle 11 may be accommodated in the receiving portion 191 and may be detachably provided on the case 10 together with the guide member 19

The guide member 19 may be mounted to the case 10 while the lower water bottle 11 is accommodated in the receiving portion 191. A user may separate the guide member 19 from the case 10 and take out the lower water bottle 11 from receiving portion 191 when it is necessary to empty the water in the lower water bottle 11.

An interfering portion 110 may be provided at an upper end of the lower water bottle 11. The interfering portion 110 may be provided so as to protrude outward from the upper end of the lower water bottle 11. An interfering rib 192 may be provided around the receiving portion 191 of the guide member 19 to interfere with the interfering portion 110. When the lower water bottle 11 is accommodated in the receiving portion 191, the interfering portion 110 may be interfered by the interfering rib 192.

When the lower water bottle 11 is received in the receiving portion 191, the interfering portion 110 may be interfered by the interfering rib 192 and positioned outside the receiving portion 191. The user may separate the lower water bottle 11 from the guide member 19 by holding the interfering portion 110 after detaching the guide member 19 from the case 10.

Figure 7:
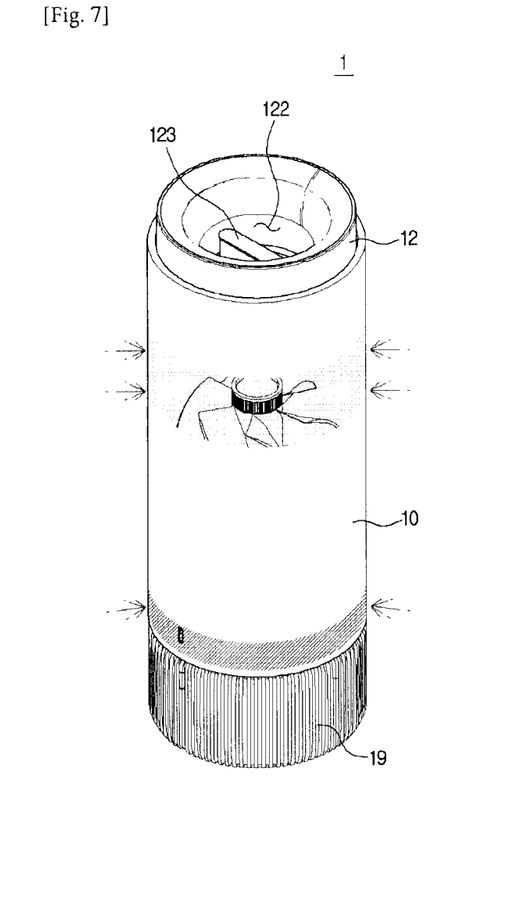
FIG. 7 is a view illustrating a lighting state of the air cleaner according to one embodiment of the present disclosure.

FIG. 7 is a view illustrating a lighting state of the air cleaner according to one embodiment of the present disclosure.

As shown in FIG. 7, the air cleaner 1 according to one embodiment may include illumination. The illumination may include a first illumination 21 indicating a replacement period of the filter and the like. The illumination may also include a second illumination 22 indicative of an operating condition of the blowing fan 14.

The first illumination 21 is provided to notify the user when it is necessary to replace the oil filter 130 and the pre-filter 131 or when it is necessary to replenish the water in the upper water bottle 12 or when it is necessary to discard collected water in the lower water bottle 11. The first illumination light 21 emits light of different colors or blinks in a different pattern so as to notice times such as when the oil filter 130 and the pre-filter 131 are to be replaced, when the water in the upper water bottle 12 is replenished, and a time to discard the water collected in the water container 11, and the like.

The second illumination 22 may be located above or below the blowing fan 14. The second illumination 22 may be turned on when the blowing fan 14 starts to operate. The second illumination 22 may be provided to adjust the brightness of the blowing fan 14 according to the rotation speed per unit time of the blowing fan 14 or change the color of the emitted light so that the operation state of the blowing fan 14 may be informed. For example, when the blowing fan 14 rotates weakly, the second illumination 22 may emit red light, and when the blowing fan 14 rotates strongly, the second illumination 22 may emit blue light.

In this manner, the light emitting state of the second illumination 22 varies according to the degree of rotation of the blowing fan 14, so that the user may check the operation state of the air cleaner 1. The user may also check the operating state of the air cleaner 1 and, if necessary, change the operation of the air cleaner 1 to be weaker state or stronger state. When the air cleaner 1 is set to be variable in the operating state according to the degree of contamination of the room air, the user may identify the degree of contamination of the room air through the second light 22.

In some cases, a portion of the case 10 corresponding to the position of the blowing fan 14 may be provided in a translucent manner. When the second light 22 emits light, the user may directly visually confirm the operating state of the blowing fan 14 through the translucent portion of the case 10.

In this manner, the user may easily check the replacement time of the filter, the time to replenish or discard the water, and manage the air cleaner 1 with the first light 21. In addition, the user may conveniently check the operation state of the air cleaner 1 by the second light 22, change the operation state of the air cleaner 1, or identify the degree of contamination of the room air.

In the above description, the replacement time of the filter, the time to replenish or discard water are displayed by illumination, but the notification function may be performed in various ways such as sound or vibration.

According to the air purifier of the present disclosure, contaminants in the air may be effectively removed using both the wet type and the dry type. The user may easily manage the air cleaner by the function of displaying the replacement time of the filter, the time to replenish the water, the time to discard the water, and the like.

The invention claimed is:

1. An air cleaner comprising:
    a case including an upper opening through which air is introduced and a lower opening from which purified air is discharged;
    a filter module detachably mounted in the case, and filtering contaminants in the air;
    an injector located below the filter module and injecting water; and
    an electric dust collector located at a lower portion of the injector and collecting dust in the air; and
    a guide member comprising a plurality of guide ribs radially provided to guide the air discharged through the lower opening of the case to a side of the case is positioned in a lower portion of the case.

2. The air cleaner of claim 1, wherein the filter module comprises an oil filter for filtering oil particles in the air and a pre-filter for filtering dust in the air.

3. The air cleaner of claim 2, wherein the oil filter and the pre-filter are provided to be separated or mounted together.

4. The air cleaner of claim 2, wherein the oil filter and the pre-filter are mounted on a filter frame.

5. The air cleaner of claim 1, wherein an upper water bottle in which water to be supplied to the injector is stored positioned at an upper portion of the case.

6. The air cleaner of claim 5, wherein an inlet port communicating with the upper opening formed in the case is formed in the upper water bottle.

7. The air cleaner of claim 1, wherein a lower water bottle for collecting water injected from the injector is located in the lower portion of the case.

8. The air cleaner of claim 1, wherein a receiving portion is provided at a center of the guide member, and a lower water bottle is received in the receiving portion.

9. The air cleaner of claim 8, wherein the lower water bottle is mounted to and detached from the case together with the guide member.

10. The air cleaner of claim 8, wherein the guide member is located at a lower outer side of the case, and an outer diameter of the guide member is the same as the outer diameter of the case.

11. The air cleaner of claim 1, wherein the electric dust collector includes a plurality of dust collecting plates and a lower end of each of the plurality of dust collecting plate is provided so that a height from the lower portion of the case decreases toward an inner side in a radial direction of the electric dust collector.

12. The air cleaner of claim 1, further comprising,
    a blowing fan flowing air inside the case.

13. The air cleaner of claim 10, wherein the case is provided with an illumination indicating an operation state of a blowing fan.

14. The air cleaner of claim 1, wherein the case is provided with an illumination indicating a replacement timing of the filter module.

* * * * *